Feb. 25, 1964 W. G. BROWN 3,121,957
COILABLE METAL RULE
Filed July 10, 1959

INVENTOR
WILLIAM G. BROWN

BY *Lindsey and Prutzman*
ATTORNEYS

United States Patent Office 3,121,957
Patented Feb. 25, 1964

3,121,957
COILABLE METAL RULE
William G. Brown, New Britain, Conn., assignor to The Stanley Works, New Britain, Conn., a corporation of Connecticut
Filed July 10, 1959, Ser. No. 826,304
7 Claims. (Cl. 33—137)

This invention relates to coilable metal rules, and more particularly to a coilable metal measuring rule encased in a plastic film, and to the method for its production.

Generally, the coilable metal rule is wound up or coiled within the housing either manually or with the assistance of a tensioning metal spring. Both flat and concavo-convex rules are employed, and the marking numerals are most generally printed onto the metal surface, although etching, plating and oxide printing methods are also utilized. Because abrasion on the rule surfaces during use and in coiling and uncoiling tends to obliterate the numerals, and rust or corrosion attack the metal after a period of use, a protective coating of lacquer is often applied to the imprinted rule.

In both painted and unpainted rules, whether lacquered or unlacquered, considerable frictional resistance to coiling and uncoiling is experienced due to the coefficient of friction of the commonly used protective coatings. Also, the painted and lacquered surfaces have been readily attacked by reactions with various solvents and chemicals which are frequently encountered during use, and oftentimes have been stained by these and other materials which imbed or perfuse the paint and lacquer. With the plated and etched rules, abrasion, rust and corrosion have been the major problems, since even stainless steel is subject to attack by the corrosive agents in some construction materials.

It is an object of this invention to provide a coilable metal rule which is substantially free from frictional resistance to coiling and uncoiling.

Another object is to provide a coilable metal rule which has high resistance to rust and corrosion, attack by chemicals and solvents and staining and which is readily cleaned.

A further object is to provide an economical and simple method for making a coilable metal rule with the aforementioned properties.

Other objects and advantages will be readily apparent from the following detailed specification and attached drawings wherein.

It has now been found that a coilable metal rule having superior properties can be prepared by encasing the metal rule in an envelope of preformed transparent, flexible plastic film.

The term "film," as used herein, refers to thin sheeting of transparent polymer, and includes both single and multiple ply, as well as single and plural strips for forming the envelope.

Although the desired properties of flexibility, toughness, wear, chemical and stain resistance, continuing transparency, and resistance to heat and cold may be provided to varying degrees by several polymers including the polyamides and polyvinyls, I prefer linear polyester film, specifically polyethylene terephthalate, which has proven particularly suitable for this application.

The film should be at least 0.1 mil in thickness, and is preferably between about 0.25 and 7.5 mils. For some applications, it may be advantageous to utilize film of even greater than 7.5 mils thickness, but a practical upper limit for the film is 10 mils.

Figure 1:
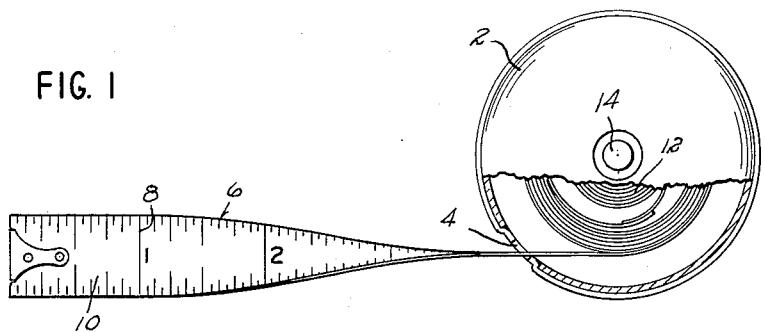
FIG. 1 is a perspective view of a coilable metal rule utilizing a spring coil or assist in coiling the measuring rule within the housing, with a portion of the housing broken away.
Figure 2:
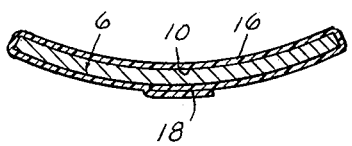
FIG. 2 is a cross-section of metal rule encased in a plastic film in accordance with the present invention.

Referring to the attached drawing, a typical push-pull coilable rule is illustrated in FIG. 1 as comprised of the housing 2 with the entrance slot 4, the flexible metal rule 6 bearing the printed measuring indicia 8 on the top face 10 thereof, or upon both faces, and the coiling metal spring 12 which is wound around the axis or core 14. As illustrated in FIG. 2, the rule 6 is encased in a plastic film 16, which is done by first placing the film on the top face 10 and folding it around the edges to make a lap seam 18 on the back face. Although not illustrated, the spring 12 is also desirably encased in the plastic film by a similar operation.

As shown, the metal rule should be completely enveloped or encased in the plastic film. This may be done by use of one or more sheets of film, the edges of which are joined to make a butt or lap seam. When the seam or seams are along the edge of the rule, they may be trimmed, but this necessity is eliminated by use of a single sheet which is folded around the rule to make a butt or lap seam on the back of the rule. The lap seam on the reverse side is especially desirable in concavo-convex tapes wherein the additional thickness of the film provided by a lap seam at the crown will provide increased wear resistance at this bearing surface. In still another mode of application, a plastic film in the form of a tube may be provided in a stretched or expanded condition for insertion of the rule, and subsequently shrunk to fit the tube tightly around the rule for bonding thereto.

Figure 3:
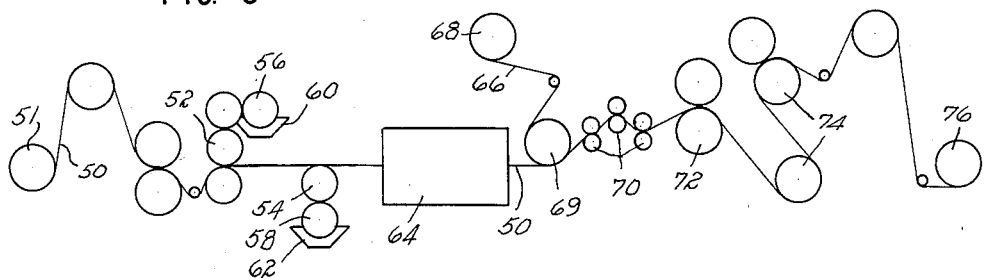
FIG. 3 is a diagrammatic representation of a process and apparatus for applying the plastic film to the metal rule.

A process and apparatus for applying the film to the metal rule or strip is diagrammatically illustrated in FIG. 3, wherein the imprinted flexible metal rule 50 from the roll 51 is unwound and is coated with adhesive on its front face by the rolls 52 and then on its reverse face by the rolls 54, which rotate counter-clockwise to apply the adhesive reversely to the passage of the metal strip, thus minimizing any tendency to deposit an excessive amount. The adhesive is transferred to the rolls 52, 54 by feed rolls 56, 58 which withdraw adhesive from the reservoirs 60, 62.

After the rule has been coated, it passes through a heating chamber 64 wherein the solvents are flashed off and activating of the cement takes place, and then plastic film 66 from the feed roll 68 is laid upon the front surface of the rule 50 at the combining roll 69. The film 66 and rule 50 then pass through a series of folding rolls 70 wherein the film is folded about the sides of the rule. The laminating rolls 72 firmly bond the plastic film 66 to the rule 50 by heat and pressure. After lamination, the encased rule is passed through the chill rolls 74 and finally coiled on the rewind reel 76.

If two strips of plastic film are utilized at combining roll 69 to form the envelope, or if an edge seam is made with a single strip, a trimming operation may be interposed before the rewinding roll 76.

As previously stated, the film is applied not only to the measuring tape, but is preferably applied also to the metal spring, where such is used. This application to the spring reduces greatly the frictional resistance to coiling and uncoiling, improves the uniformity of operation, and eliminates corrosion and rust.

In the encasement of the rule, the adhesive is preferably applied to the metal, although it may be applied to the film or to both. Generally, where the film is to be applied to a painted or imprinted metal rule, the adhesive is most advantageously coated on the metal so that the adhesive and the solvents therein will penetrate into the paint and ensure good bonding between the film and the painted surface. After application, the adhesive coating is preferably heated to 180–250° F. to partially dry and remove substantially all the solvents before the encasing and laminating operations, as well as to activate most adhesives.

The adhesive utilized for bonding the film to the measuring rule must be one which is flexible and transparent in its cured and dried state. Generally, a satisfactory adhesive will be provided by one constituting a dispersion of the film polymer in solvent with an added curing agent. For example, in laminating polyester film to the imprinted rule, a thin coating of an adhesive comprised of a dispersion of polyester resin in methyl ethyl ketone with a curing agent has been found highly satisfactory.

Since transparency is not a requisite for the spring metal strip, any flexible, durable adhesive may be employed, and synthetic rubber base adhesives have been particularly suitable.

In practice, the film may be applied to rules formed by printing, etching, selective plating or selective oxide treatment, or a combination thereof. Alternatively, the measuring indicia may be reverse printed on the inside of the plastic film prior to lamination.

A preferred embodiment of the encasing process consists of imprinting the metal strip with the numerical indicia, roller-coating first the printed face and then the reverse side with polyester adhesive in order to ensure elimination of any excess from the face, and heating the coated strip to about 200° F. to flash off the solvents and initiate curing. A polyethylene terephthalate film is then applied to the printed face and folded around the edges to form either a butt or lap seam on the reverse side and is laminated or bonded to the metal rule by passing the encased rule through laminating rolls at a temperature of about 150° to 350° F. and a pressure of about 150 to 250 p.s.i., preferably 300° F. and 200 p.s.i. The laminated rule is then chilled to about 60° F. to prevent blocking in the subsequent coiling.

Rules prepared in accordance with this invention have been found to be substantially free from frictional resistance to coiling and uncoiling, both between adjacent portions of the rule and with portions of the housing coming into contact with the rule. This reduction in friction has greatly improved the smoothness of the operating action. The plastic film has provided a durable surface which protects background and numerical indicia from abrasive wear, staining and chemical or solvent attack, and has further protected the metal of both rule and spring from rust and corrosion. The smooth surface of the plastic film also safeguards the rule from staining agents, and may be readily cleaned.

It will be readily apparent to those skilled in the art that many modifications may be made without departing from the scope and spirit of the invention.

I claim:

1. A coilable rule comprising a flexible metal strip bearing numerical indicia; an envelope of pre-cured transparent, flexible plastic sheeting between 0.1–10.0 mils in thickness around said strip to encase the same in a covering of uniform thickness; and an intermediate layer of adhesive bonding said sheeting to said strip.

2. In a coilable rule, a flexible metal strip bearing numerical indicia adapted to be coiled within a housing; a tensioning metal spring connected to the inner end of said numeral-bearing metal strip; an envelope of preformed transparent, flexible plastic sheeting encasing said metal strip, said film being 0.1–10.0 mils in thickness; an envelope of transparent flexible sheeting encasing said spring; and an intermediate layer of adhesive bonding said sheeting to said strip and to said spring.

3. A coilable rule adapted to be coiled within a housing, said rule comprising a flexible metal strip; a printed coating on at least one surface of said strip; an envelope of pre-cured transparent, flexible polyethylene terephthalate sheeting between 0.1–10.0 mils in thickness wrapped around said metal strip to encase the same in a covering of uniform thickness; and an intermediate uniform layer of adhesive bonding said sheeting to said metal strip.

4. In the manufacture of coilable rules the process comprising imprinting a flexible metal strip with measuring indicia to provide a measuring rule; applying a thin uniform coating of transparent flexible adhesive to completely cover the surfaces of said measuring rule; partially curing the adhesive; wrapping a pre-cured transparent flexible plastic sheeting 0.1–10.0 mils in thickness tightly about said adhesive coated rule to form an envelope for the rule; and laminating said sheeting to said rule.

5. The process in accordance with claim 4 wherein the plastic sheeting is polyethylene terephthalate.

6. A measuring rule adapted to be coiled within a housing, said rule comprising a flexible metal strip bearing numerical indicia; an envelope of preformed flexible transparent plastic sheeting between 0.1–10.0 mils in thickness wrapped around said strip to encase the same in a covering of uniform thickness; and an intermediate layer of adhesive bonding said sheeting to said strip; the edges of said sheeting being placed in overlapping relationship on one side of said strip to provide a lap seam for increased wear resistance.

7. A measuring rule as set forth in claim 6 wherein the metal strip is curved in a transverse direction to provide convex and concave surfaces and the lap seam is positioned on the convex surface.

References Cited in the file of this patent

UNITED STATES PATENTS

| | | |
|---|---|---|
| 1,728,420 | Little | Sept. 17, 1929 |
| 1,905,392 | Freyberg | Apr. 25, 1933 |
| 2,156,907 | Volz | May 2, 1939 |
| 2,207,277 | Volz | July 9, 1940 |
| 2,471,329 | Keuffel | May 24, 1949 |
| 2,657,161 | Luitwieler | Oct. 27, 1953 |
| 2,659,153 | Beeber | Nov. 17, 1953 |
| 2,714,569 | Prindle et al. | Aug. 2, 1955 |
| 2,961,365 | Sroog | Nov. 22, 1960 |

OTHER REFERENCES

E. I. du Pont de Nemours and Co., Wilmington, Del., Film Dept., "Mylar Polyester Film," rec'd. June 15, 1956 but dated September 1955, p. 3 relied on. (Copy in Scientific Library.)

E. I. du Pont de Nemours and Co., Wilmington, Del., Film Electrical and Chemical Properties of Mylar, August 1956. Received in the Scientific Library Aug. 1, 1957, (Copy in Div. 60.)